(No Model.) 6 Sheets—Sheet 1.

C. E. LIPE.
UNIVERSAL MILLING MACHINE.

No. 292,928. Patented Feb. 5, 1884.

WITNESSES:
T. S. West.
Wm. T. Emerson.

INVENTOR:
CHARLES E. LIPE,
BY H. W. Beadle & Co.
ATTYS.

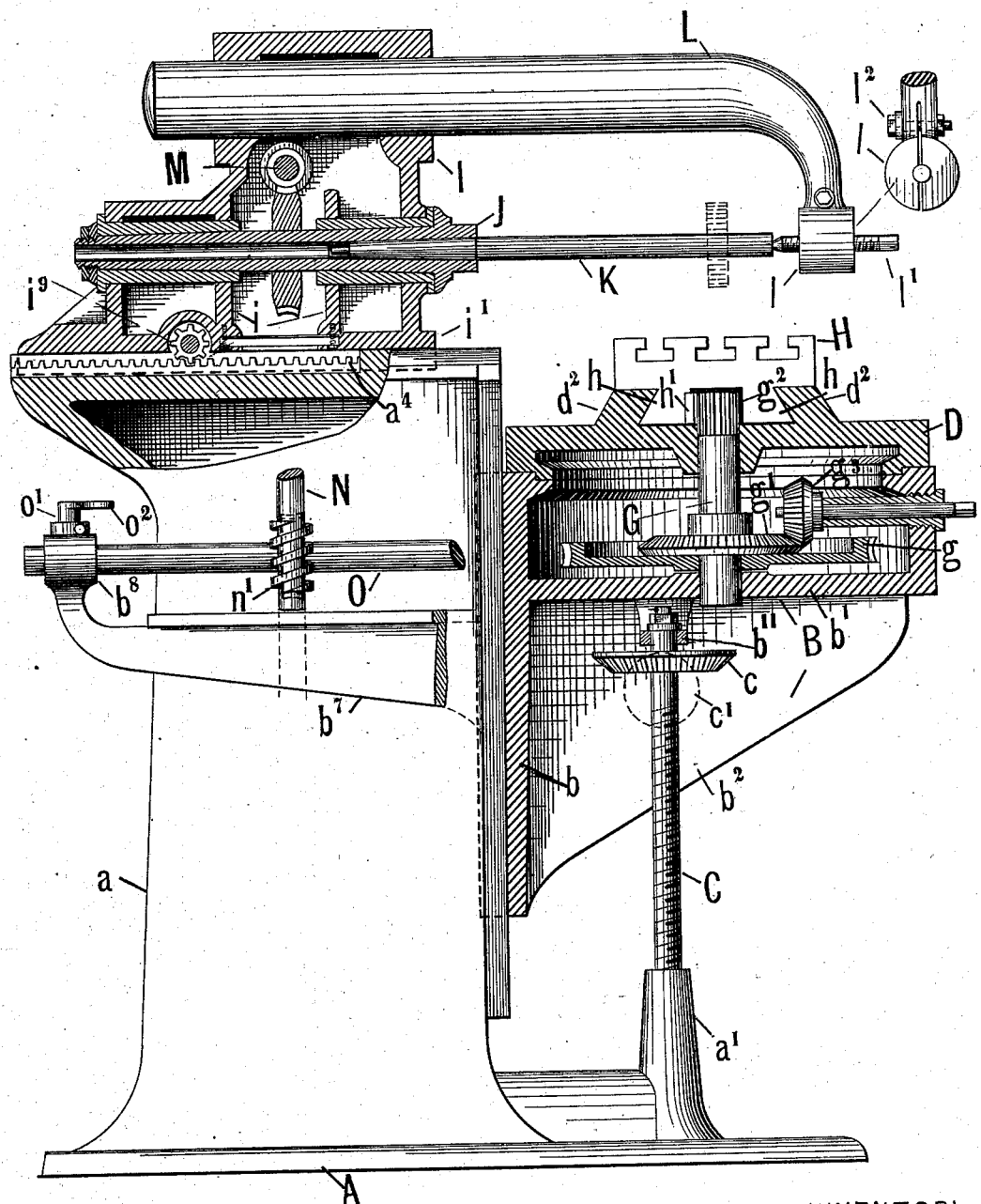

(No Model.)  6 Sheets—Sheet 3.
C. E. LIPE.
UNIVERSAL MILLING MACHINE.
No. 292,928.  Patented Feb. 5, 1884.
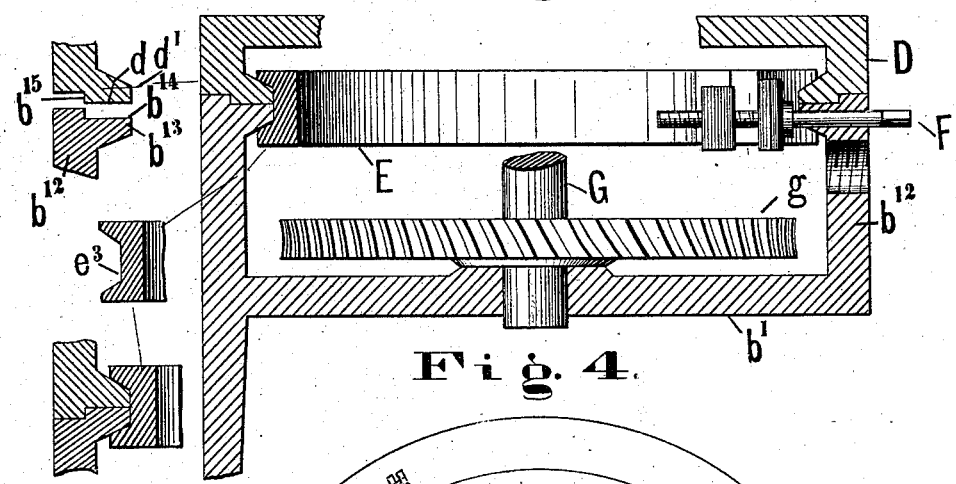
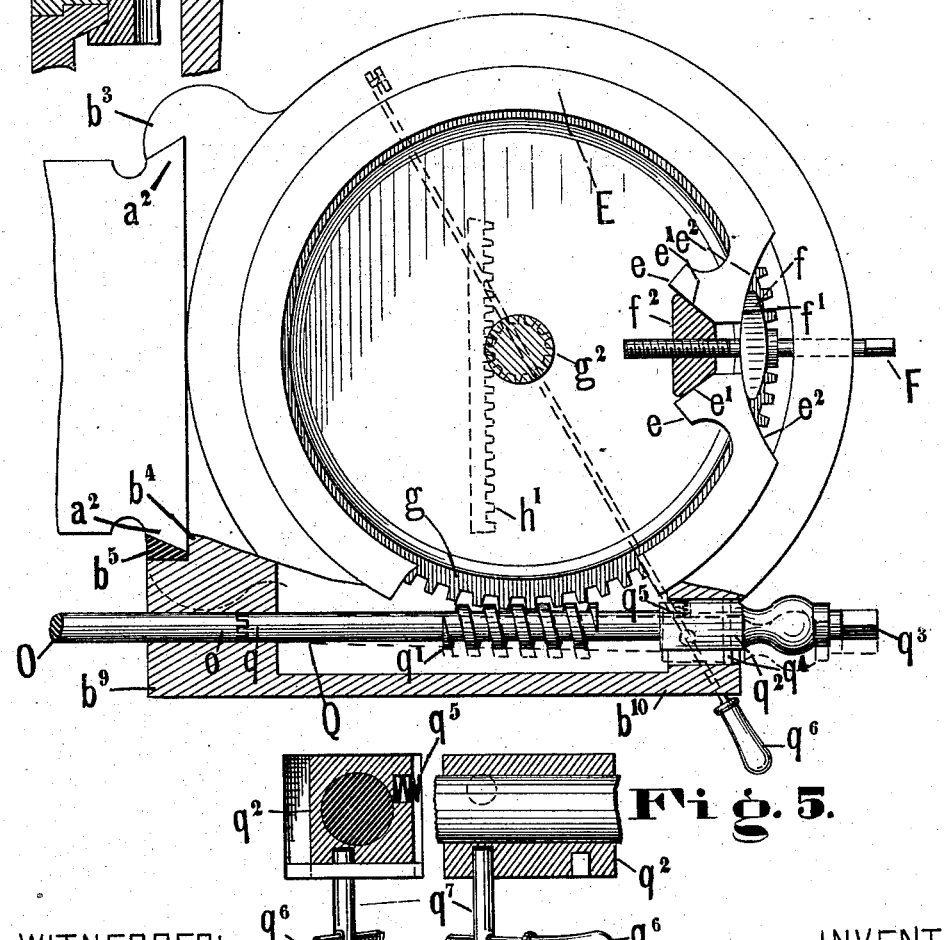
WITNESSES:
T. S. West.
Wm. T. Emerson.
INVENTOR:
CHARLES E. LIPE,
BY H. W. Beadle & Co.
ATTYS.

(No Model.) 6 Sheets—Sheet 4.
C. E. LIPE.
UNIVERSAL MILLING MACHINE.
No. 292,928. Patented Feb. 5, 1884.
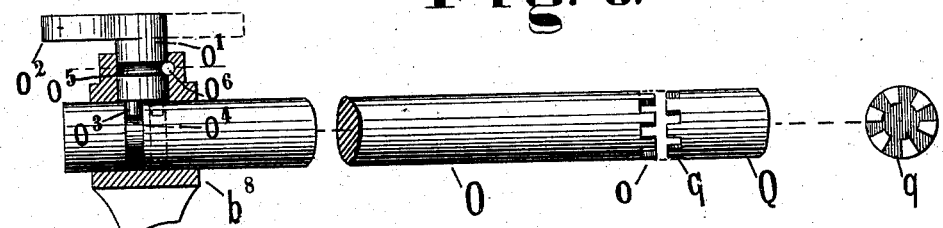
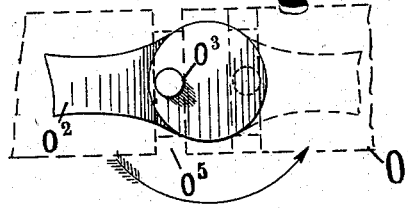
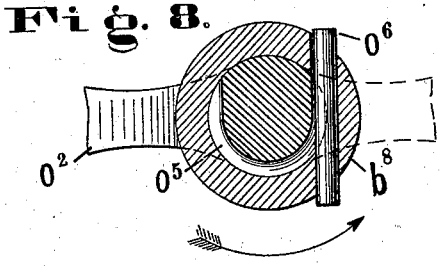
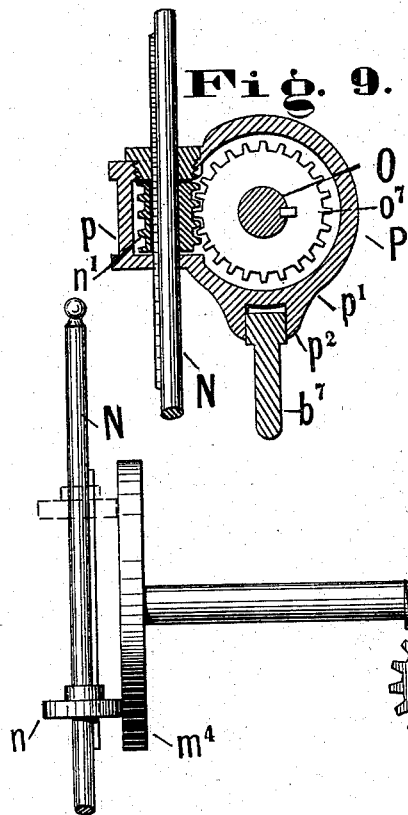
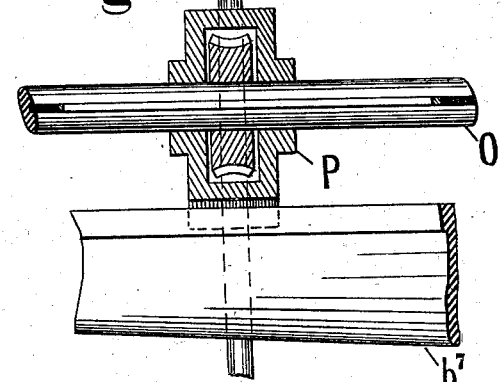
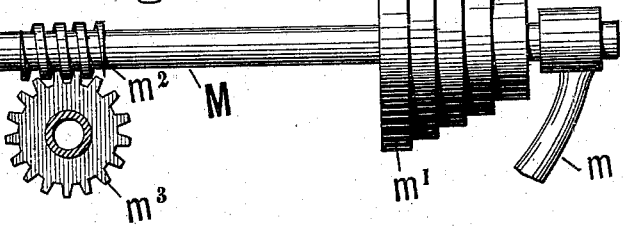
WITNESSES:
T. S. West.
Wm. T. Emerson.
INVENTOR:
CHARLES E. LIPE,
BY H. W. Beadle & Co.
ATTYS.

(No Model.) 6 Sheets—Sheet 5.

C. E. LIPE.
UNIVERSAL MILLING MACHINE.

No. 292,928. Patented Feb. 5, 1884.

WITNESSES:
T. S. West
Wm. T. Emerson

INVENTOR:
CHARLES E. LIPE,
BY H. W. Beadle & Co.
ATTYS.

(No Model.)

6 Sheets—Sheet 6.

C. E. LIPE.
UNIVERSAL MILLING MACHINE.

No. 292,928. Patented Feb. 5, 1884.

WITNESSES:
T. S. West
Wm. T. Emerson

INVENTOR:
CHARLES E. LIPE.
BY H. W. Beadle & Co.
ATTYS.

UNITED STATES PATENT OFFICE.

CHARLES E. LIPE, OF SYRACUSE, NEW YORK.

UNIVERSAL MILLING-MACHINE.

SPECIFICATION forming part of Letters Patent No. 292,928, dated February 5, 1884.

Application filed June 15, 1883. (No model.)

*To all whom it may concern:*

Be it known that I, CHARLES E. LIPE, of Syracuse, county of Onondaga, and State of New York, have invented new and useful Improvements in Universal Milling-Machines; and I do hereby declare that the following is a full and exact description of the same, reference being had to the accompanying drawings, and to the letters of reference marked thereon.

This invention relates to that class of milling-machines which are adapted for universal use; and it consists, mainly, in certain combinations of new and old elements, hereinafter fully described, by means of which certain marked advantages are obtained, as will be hereinafter set forth.

Figure 1:
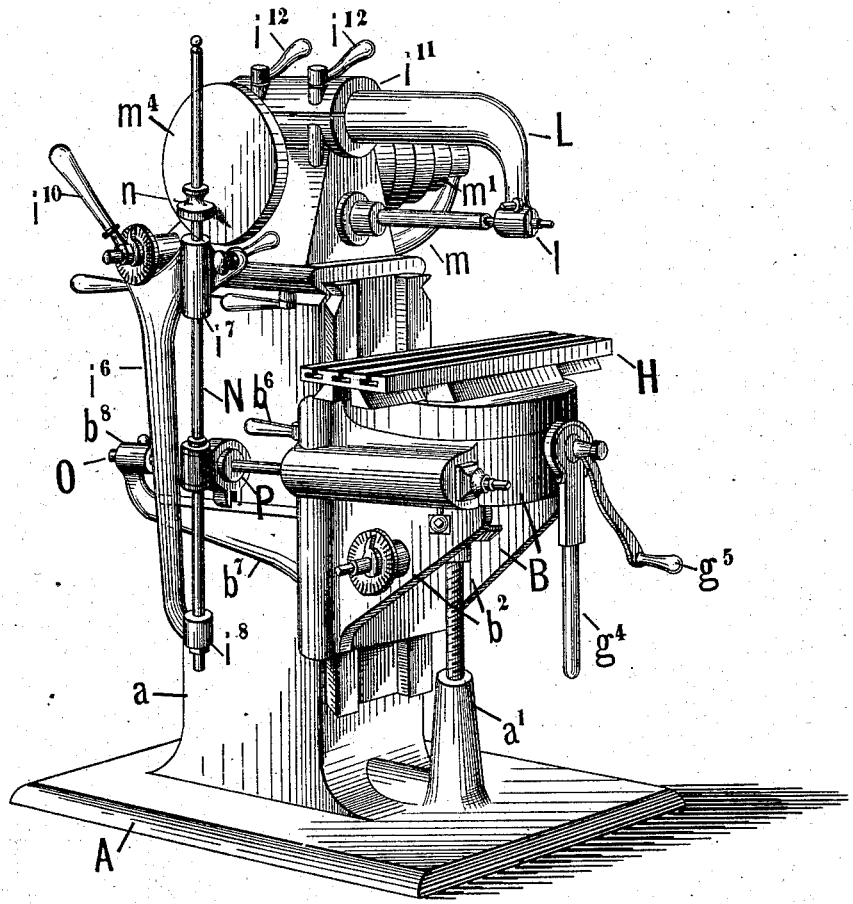
Figure 12:
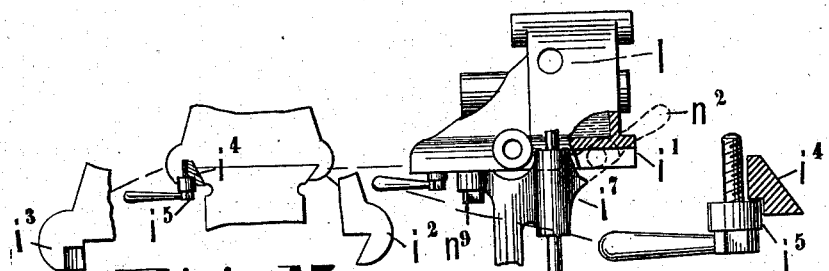
Figure 13:
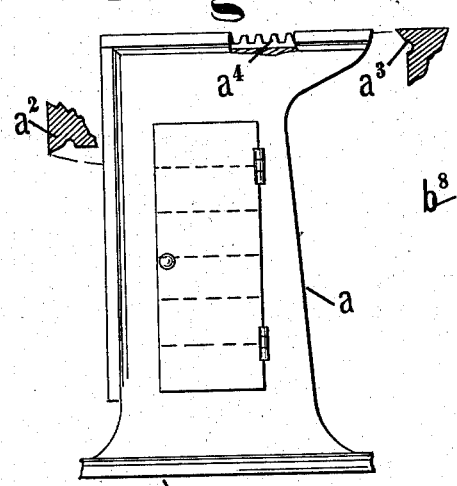
Figure 14:
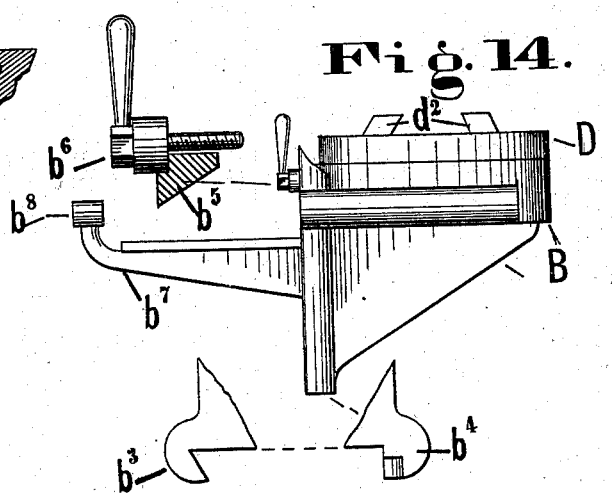

In the drawings, Figure 1 represents a perspective view of my improved machine; Fig. 2, a side elevation, with the horizontal moving head and the vertically-moving bracket shown in section; Fig. 3, a sectional view of the box and cap of the supporting-bracket; Fig. 4, a plan view of the same; Fig. 5, detail views of the mechanism for disengaging the actuating-worm from the worm-gear when it is desired to move the work-table quickly by hand; Fig. 6, a view of the clutch-shaft and the mechanism for moving the shaft into and out of gear; Figs. 7 and 8, detail views of this mechanism for moving the shaft into and out of gear; Figs. 9 and 10, detail views of the connecting-box for uniting the vertical and horizontal shafts; Fig. 11, a side view of the main driving-shaft and its attachments for receiving and communicating movement; Fig. 12, a side view of the horizontally-moving head detached; Fig. 13, a side view of the fixed supporting-column detached; Fig. 14, a side view of the vertically-moving bracket detached, and Fig. 15 a sectional view of the cutter-spindle and the parts immediately connected therewith. Figs. 16, 17, 18, and 19 are detail views of the mechanism for regulating the pressure of the friction-wheel $n$ upon the disk $m^4$.

To enable others skilled in the art to make and use my improved machine, I will proceed to describe fully its construction and manner of operation.

For convenience and clearness, this invention will be described under four distinct heads, as follows: first, the fixed supporting-column; second, the vertically-moving bracket supporting the work-table and the hand mechanism for actuating the same; third, the horizontally-moving head on the top of the column, carrying the driving-shaft and attachments for receiving and communicating movement, the cutter-spindle and cutter, and other parts; fourth, the intermediate mechanism for communicating the movement of the driving-shaft upon the head to the work-table upon the bracket.

I. The fixed supporting-column.

A, Figs. 1, 2, and 13, represents a base or foundation-plate, from which rises the quadrangular hollow column $a$, of requisite strength and stiffness to support the moving parts. A proper opening may be made in one of the sides of this column, and the interior space be fitted with shelves for holding tools. A door also may be provided, if desired, for the purpose of closing this opening.

$a'$ represents a hollow conical extension extending vertically from the base-plate $a$, the interior of which is threaded to receive the lower end of the screw C, hereinafter referred to.

$a^2 a^2$, Figs. 4 and 13, represent projections upon each side of one of the side faces of the column, which are provided with inclined ways or bearing-surfaces adapted to engage with corresponding ways or bearing-surfaces upon the bracket B, hereinafter referred to.

$a^3 a^3$, Fig. 13, represent similar projections upon each side of the upper face of the column, which are provided with inclined ways or bearing-surfaces adapted to engage with corresponding ways or bearing-surfaces upon the head I, hereinafter referred to.

$a^4$, Figs. 2 and 13, represents a rack-bar located on the upper face of the column, which rack-bar is adapted to engage with a pinion, hereinafter referred to, upon the horizontally-moving head. The column thus constructed is adapted to furnish a solid basis of support for the main moving parts.

II. The vertically-moving bracket supporting the work-table and the hand mechanism for actuating the same. For convenience, this main division will be subdivided as follows: first, the bracket proper and the mechanism for giving it vertical movement; second, the box and the cap of the bracket and the mechanism for clamping these two together; third, the work-table and the mechanism for giving it a slow and powerful movement by hand; fourth, the disengaging mechanism for throwing out of gear the mechanism for giving the work-table a slow and powerful movement; and, fifth, the mechanism for giving the work-table a rapid movement by hand.

First. The bracket proper and the mechanism for giving it a vertical movement.

B, Figs. 2 and 14, represent the bracket, consisting of a vertical base-piece, $b$, Fig. 2, a horizontal supporting-plate, $b'$, and two triangular brace-pieces, $b^2 b^2$, these parts being united together to form a structure of great rigidity and stiffness.

$b^3$, Fig. 4, represents a projection upon one side of the base-plate of the bracket, which is provided with a recess having an inclined bearing-surface adapted to engage with the corresponding bearing-surface upon the projection $a^2$ of the column $a$.

$b^4$, Fig. 4, represents a projection upon the other side of the base-plate, which is provided with a square recess adapted to hold the gib $b^5$, this gib having an inclined bearing-surface adapted to engage with the corresponding bearing-surface, $a^2$, upon the column $a$, as shown. By means of this construction the bracket B is strongly united to the column $a$ in such manner as to be capable of free movement thereon in a vertical direction.

$b^6$, Figs. 1 and 14, represents a tightening-screw, by means of which the bearing-face of the gib $b^5$ may be clamped upon the bearing-face of the projection $a^2$, for the purpose of rigidly holding the bracket in any desired position.

$b^7$, Figs. 1, 2, and 14, represents an arm extending outward from the base-plate $b$ of the bracket B, which is provided at its extreme end with a bearing, $b^8$, for supporting the outer end of the horizontal shaft O, hereinafter referred to.

$b^9$, Fig. 4, represents a bearing upon the bracket, adapted to support the inner end of the shaft O and the adjacent end of the horizontal shaft Q, hereinafter referred to; and $b^{10}$, a bearing upon the bracket, adapted to support the movable journal-box $q^2$ at the outer end of the shaft Q, as shown.

$b^{11}$, Fig. 2, represents a bearing-plate held by suitable arms projecting from the plate $b'$, as shown.

C represents a threaded shaft, before referred to, the lower end of which is held in the threaded socket $a'$ and the upper end in the bearing-plate $b^{11}$, as shown.

$c$ represents a bevel-gear wheel located near the upper end of the shaft, and $c'$ a bevel-pinion engaging therewith, the shaft of which latter extends through one of the brace-pieces $b^2$ into convenient position to receive a crank.

By the revolution of the crank, the shaft C, by means of the pinion $c'$ and wheel $c$, is revolved and caused to move into or out of the socket $a'$, according to the direction of the revolution. This vertical movement of the shaft C, it will be understood, is communicated by means of the bearing $b^{11}$ directly to the knee B.

Second. The box and the cap of the bracket and the mechanism for clamping the two together.

$b^{12}$, Fig. 3, represents a vertical extension from the horizontal plate $b'$, which forms, in connection with the plate, a circular box for holding a portion of the mechanism for actuating the work-table and the mechanism for clamping the box and cap together.

$b^{13}$ represents an inwardly-extending projection at the upper edge of the box, which is provided with an inclined bearing-face, as shown.

$b^{14}$ represents a recess in the upper edge of the box, which is adapted to receive a corresponding projection in the face of the lower edge of the cap, as shown.

D represents the cap or cover of the box, having this projection $d$ adapted to extend into the recess $b^{14}$, the purpose of this construction being to secure the cap to the box without interference with its freedom of revolution.

$d'$ represents an inwardly-extending projection at the lower edge of the cap, which is provided with an inclined bearing-face, as shown, the incline in this case, however, being opposite to the incline upon the projection $b^{13}$.

$d^2 d^2$, Figs. 2 and 14, represent projections upon the cap, which are provided with inclined ways for guiding the work-table (hereinafter referred to) in its movement.

E, Figs. 3 and 4, represents an open ring, each end of which is provided with a projection, $e$, Fig. 4, having an inclined bearing-face, $e'$, and a curved bearing-face, $e^2$, as shown.

$e^3$ represents a recess in the periphery of the ring, which is provided with inclined sides, as shown.

F represents an adjusting-screw, one end of which extends through the wall into convenient position to receive a wrench or crank, as shown.

$f$ represents a plate encircling the screw F and abutting against the shoulder $f^4$ thereon. The inner face, $f'$, conforms to and bears against $e^2$.

$f^2$ represents a nut threaded to receive the screw F, and having sloping or wedge-shaped sides adapted to impinge against the face $e'$ of the ring. By turning the adjusting-screw the nut $f^2$ is caused to approach or recede from the plate $f$, according to the direction of the movement, and consequently the ends of the open ring against which the movable nut bears are either permitted to approach each other or caused to separate from each other, according to the circumstances of the case, there being sufficient elasticity to the ring to admit of the slight necessary expansion. By the separation of the ends of the ring, the same is caused to expand and press with the inclined sides of its recess upon the inclined sides of the box and cap and strongly clamp the two together. By means of this construction the cap may be first revolved upon the box into any desired position, and then be securely held against movement by means of the clamping mechanism described.

Third. The work-table and the mechanism for giving it a slow and powerful movement by hand.

G, Figs. 2, 3, and 4, represents a vertical shaft supported below by proper bearings in the plate $b'$ and above by proper bearings in the cap D, which is provided near its lower end, within the box, with a wheel having on its outer periphery the worm-gear $g$ and upon its inner face the bevel-wheel $g'$, as shown.

$g^2$ represents a pinion upon the upper end of the shaft G, which is adapted to engage with the rack-bar, hereinafter referred to, of the work-table.

H represents the work-table, of the usual quadrangular form, as shown in Fig. 1, which is provided below with the projections $h\ h$, having inclined ways adapted to engage with the inclined ways of the projections $d^2\ d^2$ of the cap, and the rack-bar $h'$, adapted to engage with the pinion $g^2$, before referred to.

$q'$, Fig. 4, represents a worm upon a horizontal shaft, Q, hereinafter referred to, which engages with the worm-gear $g$ upon the vertical shaft G.

$q^3$ represents an angular head at the end of the shaft, which is adapted to receive a crank when desired. The shaft Q, when power is used, is connected by a clutch, $q$, to a shaft, O; but when it is desired to actuate the work-table by hand the shaft O is disconnected from the shaft Q by mechanism hereinafter described. When thus disengaged, a slow and powerful movement may be communicated to the work-table by applying a hand-crank to the head $q^3$. By thus revolving the shaft Q, the worm $q'$ is caused to revolve the worm-gear and actuate the table through the pinion $g^2$ and rack-bar $h'$.

Fourth. The disengaging mechanism for throwing out of gear the mechanism for giving the work-table a slow and powerful movement. When it is desired to impart a quick movement to the work-table, it is essential that the worm $q'$ should be disengaged from the worm-gear $g$. This is accomplished by the following mechanism.

$q^2$, Figs. 4 and 5, represents a journal-box furnishing the bearings for the outer end of the shaft Q, which box is itself capable of a lateral movement upon proper bearings, as indicated in dotted lines, Fig. 4.

$q^4$ represents a rod or bar resting in a proper recess in the box, which bar is adapted to guide the box properly in its movement.

$q^5$ represents a spring resting in a proper recess in this box, one end of which bears against a solid portion of the bracket B and the other end against the box, as shown.

$q^6$ represents a lever running beneath the box, which is provided with a stud, $q^7$, which, when the parts are in their normal position, extends into a recess of the box, as shown.

The operation is substantially as follows: When the parts are in their normal position, and it is desired to obtain a slow and powerful feed either by power or hand, the stud $q^7$ of the lever $q^6$ remains in its recess and holds the journal-box from movement by the action of the spring $q^5$. When it is desired to obtain a quick feed, the lever $q^6$ is depressed to disengage its stud from its recess, and the spring $q^5$ consequently being free to act, the journal-box is moved over thereby to throw the worm $q'$ out of gear with the worm-wheel $g$. The clutch end $q$ of the shaft Q has sufficient play to permit this movement of the shaft without injury.

Fifth. The mechanism for giving the work-table a rapid movement by hand.

$g^3$ represents a bevel-pinion engaging with the gear $g'$, the shaft of which extends through the side of the box into convenient position to receive a friction-lever, $g^4$, and a crank, $g^5$, as shown. By means of this lever or crank the shaft G, by means of the pinion $g^3$ and gear $g'$, may be revolved in either direction, when desired, with a quick movement.

The operation of these parts is substantially as follows: The bracket is adjusted vertically upon the column by revolving a crank upon a shaft of pinion $c'$, this action, through the pinion $c'$ and gear-wheel $c$, causing the shaft C to revolve, and thus travel vertically in the fixed socket $a'$. The work-table is turned into any desired position by simply revolving the cap D upon the box $b'\ b^{10}$. It is securely held in any desired position, when adjusted, by actuating the adjusting-screw F to expand the clamping-ring. By the revolution of the shaft G through the mechanism described, the work-table, by means of the pinion $g^2$ on the shaft and the rack-bar $h'$ on the table is caused to travel in a longitudinal direction over the cap. By the use of the worm $q'$ and a crank upon the head $q^3$, a slow and powerful movement by hand is obtained. By disengaging the worm $q'$ and using the crank $g^5$ a quick movement by hand is obtained.

III. The horizontally-moving head on the top of the column, carrying the driving-shaft and attachments for receiving and communicating movement, the cutter-spindle and cutter, and other parts. For convenience, this main division will be divided as follows: first, the head proper and the mechanism for giving it horizontal movement upon the column; second, the cutter-spindle and cutter; third, the arm for supporting the outside center bearing of the cutter-shaft; and, fourth, the driving-shaft and its attachments for receiving and communicating movement.

First. The head proper and the mechanism for giving it horizontal movement.

I, Figs. 1, 2, and 12, represents the head, consisting of a hollow pyramidal casting, having within the same transverse partitions $i$ $i$, Figs. 2 and 15, adapted, in connection with the end walls, to furnish proper bearings for the cutter-spindle hereinafter referred to, and to form chambers or compartments for holding the oil, as shown. The worm-gear is thus made to revolve in oil, and carries a sufficient amount to the worm above to maintain perfect lubrication.

$i'$ represents the base-plate of the head, which is provided upon one side of its lower face with a projection, $i^2$, having an inclined bearing-surface adapted to engage with the corresponding bearing-surface upon the projection $a^3$ of the column.

$i^3$ represents a projection upon the other side of the lower face of the base-plate, which is provided with a square recess adapted to hold the gib $i^4$, this gib having an inclined bearing-surface adapted to engage with the corresponding bearing-surface upon the column $a$, as shown. By means of this construction the head I is strongly united to the column $a$ in such manner as to be capable of free movement thereon in a horizontal direction.

$i^5$ represents a tightening-screw, by means of which the bearing-face of the gib $i^4$ may be clamped upon the bearing-face upon the projection $a^3$, for the purpose of rigidly holding the head in any desired position.

$i^6$, Fig. 1, represents an arm extending in a downward direction from the head, which is provided above and below with bearings $i^7$ $i^8$ for supporting the vertical shaft N, hereinafter referred to.

$i^9$, Fig. 2, represents a pinion, the shaft of which is held in proper bearings of the base-plate of the head, which pinion is adapted to engage with the rack-bar $a^4$ upon the column, as shown in Fig. 2.

$i^{10}$, Fig. 1, represents a lever upon one end of the shaft, by means of which the pinion is revolved when it is desired to move the head upon the column.

$i^{11}$, Fig. 1, represents a hollow cylindrical bearing at the top of the head, which is split upon one side, as shown, and $i^{12}$ $i^{12}$ grip-screws, by means of which this cap may be loosened upon the head or tightened upon it, as may be desired. The head thus constructed is adapted to move horizontally over the column, when desired, and to carry with it the various parts which are supported thereby.

Second. The cutter-spindle and cutter.

Figure 15:
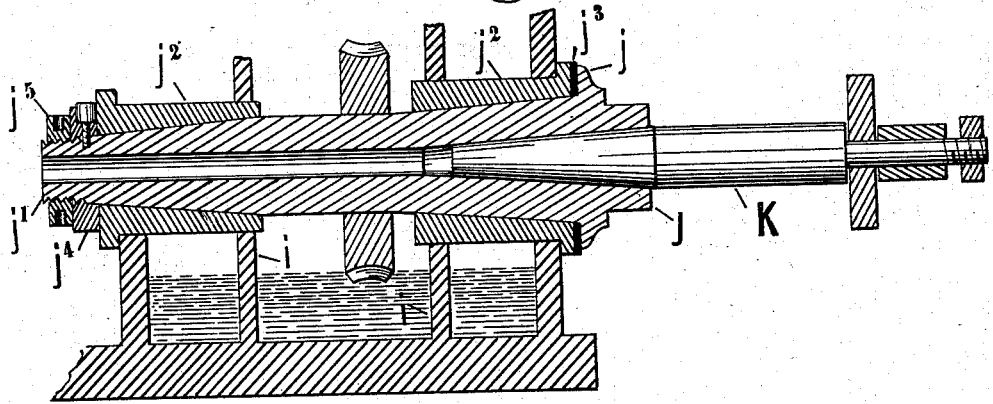

J, Fig. 15, represents a spindle consisting of a tapering cylinder having a central opening, which opening is also made tapering at one end, as shown.

$j$ represents a shoulder at one end of the spindle, and $j'$ a threaded portion at the other end.

$j^2$ $j^2$ represent tapering bushes or boxes, by means of which the spindle is held in the head in such manner as to be capable of free revolution.

$j^3$ represents a washer located between the shoulder $j$ of the spindle and the end of the adjacent bushing $j^2$, and $j^4$ a washer pinned to the spindle at the other end, as shown. $j^5$ represents a nut upon the threaded portion of the spindle. By means of this construction it is possible to make proper compensation for the wear of the parts when desired, this result being accomplished by reducing the thickness of the washer $j^3$ and screwing up the nut $j^5$.

K represents the cutter-arbor, which is provided at one end with a tapering portion adapted to fit the tapering opening of the spindle, and at the other end with a reduced portion adapted to receive the cutter and collars, and also with a threaded end adapted to receive a nut, as shown. The extreme end of the arbor, also, may be provided with usual recess or center for receiving the outside center-support, hereinafter referred to. By means of this construction the cutter-arbor is secured to the spindle so as to revolve with it.

Third. The arm for supporting the outside center bearing of the cutter-arbor.

L, Figs. 1 and 2, represents an arm curved at one end, as shown, which is held in proper bearings in the upper portion of the head I in such manner as to be capable of free movement in a longitudinal direction, or free revolution on its longitudinal axis. By means of the grip-screws $i^{12}$ the arm may be rigidly secured in any position in which it may be adjusted.

$l$ represents a threaded socket-bearing formed at the end of the curved portion of the arm L, which bearing is split, as shown.

$l'$ represents a pointed adjusting-screw held in the bearing, the point of which is adapted to furnish a proper center-bearing for the outer end of the cutter-arbor, as shown.

$l^2$ represents a set-screw, by means of which the parts of the socket may be brought together for the purpose of clamping the center bearing in any position in which it may be adjusted. This arm L may be turned up out of the way, if desired, or be entirely removed from the machine. By means of this arm a steady bearing is furnished for the outer end of the cutter-arbor.

Fourth. The driving-shaft and its attachments for receiving and communicating movement.

M, Figs. 2 and 11, represents the driving-shaft, which is transversely held in proper bearings in the head and in the bracket-arm $m$, extending from the head, as shown in Fig. 1.

$m'$, Figs. 1 and 11, represents a cone-wheel located upon one end of the shaft, by means of which movement is received from any proper mechanism located above the machine.

$m^2$, Figs. 2 and 11, represents a worm located upon the shaft within the head, and $m^3$ a worm-wheel keyed upon the spindle J, which engages therewith.

$m^4$, Figs. 1 and 11, represents a friction-disk located upon the end of the shaft outside the head, the purpose of which will be hereinafter described. By means of this construction the movement received through the cone-pulley from any proper source of power is communicated from the driving-shaft through the worm mechanism described to the cutter-spindle and cutter, and through the friction-disk to the automatic mechanism for actuating the work-table, as will be fully described hereinafter.

IV. The intermediate mechanism for communicating the movement of the driving-shaft upon the head to the work-table upon the knee.

$m^4$, Fig. 1, represents the friction-disk, before referred to, upon the end of the driving-shaft M.

N represents a vertical shaft held in the bearings $i^7$ $i^8$ of the arm $i^6$, depending from the head L, as before described.

$n$ represents a friction-wheel located on the shaft near its upper end, which is adapted to bear against the friction-disk $m^4$ for the purpose of receiving movement therefrom. This wheel is feathered on the shaft, and is retained by suitable fastenings, and is capable of vertical adjustment upon the shaft, first, for the purpose of varying the speed, this result being accomplished by moving the wheel nearer to or farther from the center, and, second, for the purpose of changing the direction of the movement, this result being accomplished by moving the wheel to the opposite side of the friction-disk.

Figure 16:
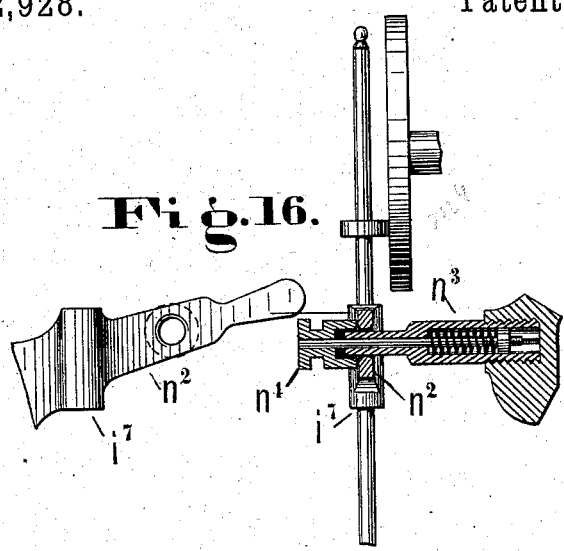
Figure 17:
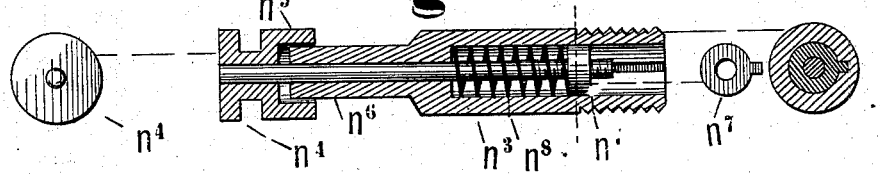
Figure 18:
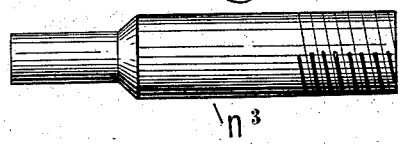
Figure 19:

The pressure of the friction-wheel $n$ upon the disk $m^4$ is regulated by the following mechanism:

$n^2$, Figs. 12, 16, and 17, represents an arm projecting from the bearing $i^7$, and $n^3$, Fig. 16, a hollow stud rigidly secured to the head I, which extends through the arm $n^2$, as shown.

$n^4$ represents a knob having the cylindrical portion $n^5$, adapted to bear upon the arm $n^2$, and the rod $n^6$, with threaded end, as shown.

$n^7$ represents a nut located upon the threaded end of the rod, which is provided with a key or feather adapted to lie in a groove of the stud $n^3$ and prevent revolution, in the manner well understood.

$n^8$ represents a spring located between the nut and a shoulder of the stud, as shown. The spring exerts its pressure against the nut $n^7$ and causes the rod $n^6$ and the knob $n^4$, attached thereto, to move in the arm $n^2$ and press the friction-disk $n$ against the friction-disk $m^4$, the arm $i^6$ being capable of a slight vibration upon the pivotal point $n^9$, Fig. 12, and the pivotal point $n'$, Fig. 9. By turning the knob the pressure of the spring may be increased or diminished. By means of the handle $n^2$, the disk $n$ may be removed entirely from contact with the disk $m^4$ when it is desired to adjust the former.

O, Figs. 1, 2, and 4, represents a horizontal shaft, supported at one end of the bearing $b^8$ of the arm $b^7$ of the knee B, and at the other in the bearing $b^9$, Fig. 4, of the knee, as shown.

$o$ represents a clutch by means of which the shaft is removably attached to the shaft Q, hereinafter referred to.

$o'$, Figs. 2 and 6, represents a vertical shaft held in the bearing $b^8$, which is provided above with a lever-arm, $o^2$, and below with a stud or pin, $o^3$, Figs. 6 and 7, adapted to rest in the groove $o^4$ of the shaft O.

$o^5$, Figs. 6 and 8, represents a groove in the vertical shaft, which extends about the same about one-half the distance, as shown in Fig. 6.

$o^6$ represents a pin projecting from the bearing into the groove, by means of which the vertical shaft is secured in place, and is also properly limited in its movement. By actuating the lever arm or handle $o^2$, the vertical shaft $o'$ is revolved, and its stud or pin $o^3$, resting in the groove $o^4$, is caused to move the shaft O longitudinally, either to engage with the shaft P or to be disengaged therefrom.

P, Figs. 1, 9, and 10, represents a connection-box, having a vertical portion, $p$, Fig. 9, adapted to inclose the worm $n'$ upon the vertical shaft N, and a horizontal portion, $p'$, adapted to inclose the worm-gear $o^7$ upon the shaft O.

$p^2$ represents a forked projection straddling the arm $b^7$, by means of which the box is properly guided in its horizontal movement. The shafts N and O are each provided with long keys or feathers, as shown. By means of this construction an automatically-adjusting connection is maintained between the two shafts. The vertical movement of the knee slides the box along the vertical shaft and the movement of the head slides it along the horizontal shaft.

Q represents the horizontal shaft before referred to, which is provided with a clutch, $q$, by means of which it is removably attached to the horizontal shaft.

$q'$ represents a worm upon the shaft, adapted to engage with the worm-gear $g$ upon the vertical shaft G, before referred to.

The general operation of my improved machine is substantially as follows: The bracket B having been adjusted into the proper vertical position to suit the work by the mechanism hereinbefore described, and having been locked into its adjusted position by means of the tightening-screws, the work-table may be turned into the proper lateral position by revolving the cap D, and be locked in the adjusted position by expanding the clamping-ring. The table then may be adjusted longitudinally into any desired position by revolving the crank $g^5$ by hand. The work thus having been brought into proper relation to the milling-tool, the worm $q'$ may be caused to engage with the gear-wheel $g$, as shown in Fig. 4, and motion be communicated to the main driving-shaft M.

The movement of the main shaft is communicated to the cutter-spindle and cutter by means of the worm $m^2$ and wheel $m^3$, and to the rack-bar $h'$ of the work-table by the friction-disk $m^4$, the friction-wheel $n$, the vertical shaft N, with worm $n'$, the horizontal shaft O, with wheel $o^7$, the horizontal shaft Q, with worm $q'$, the wheel $g$, and vertical shaft G, with pinion $g^2$.

When it is desired to disconnect the power from the work-table, the lever $o^2$ of the vertical shaft $o'$ is actuated to disconnect the shaft O from the shaft Q, in the manner before described.

When it is desired to give a slow and powerful movement to the work-table, a crank is applied, when the power is thus disconnected, to the end $q^3$ of the shaft Q, in the manner before described.

When it is desired to give a quick movement to the work-table by hand, the worm $q'$ is disconnected from the gear $g$ by the disengaging mechanism hereinbefore described. This disengagement may also be effected without the previous disengagement of the clutch-shaft.

Some of the advantages of the described construction are as follows: The structure possesses extreme strength and stiffness at the essential points. It has powerful driving-gear adapted to take heavy cuts. It has delicacy of movement with positiveness of adjustment. It has a wide range within the limits of adjustment. It has quick-acting and simple means for locating the moving parts. The feed may be quickly and easily adjusted. The working parts are thoroughly protected from chips and dirt. The machine as a whole is adapted to meet a large variety of requirements.

Having thus fully described my invention, what I claim as new, and desire to secure by Letters Patent, is—

1. In combination with the fixed box $b'$ $b^{12}$ of the vertically-moving bracket, the cap D, adapted to revolve upon the box, and an expansible ring, substantially as described, adapted to clamp the cap to the box.

2. In combination with the fixed box and moving cap, the expanding ring E, adjusting-screw F, and nuts $f$ $f^2$, adapted to clamp the cap to the box, as described.

3. In combination with the clutch-shaft Q, having the worm $q'$, and mechanism, substantially as described, for moving the shaft out of gear, the wheel $g$, vertical shaft G, pinion $g^2$, rack-bar $h'$, and the table H, as described.

4. In combination with the rack-bar $h'$ of the work-table H, the shaft G, having the wheels $g$, $g'$, and $g^2$, as and for the purpose described.

5. In combination with the wheel $g$ and shaft Q, with clutch $q$ and worm $q'$, the movable journal-box, as and for the purpose described.

6. In combination with the shaft Q, with clutch $q$ and worm $q'$, the movable journal-box $q^2$, and the actuating-spring $q^5$, the shaft, by the action of the spring, being moved upon the clutch-point as a pivot, as described.

7. In combination with the shaft Q, the movable journal-box $q^2$, the actuating-spring $q^5$, the lever $q^6$, and stud $q^7$, as and for the purpose set forth.

8. In combination with the horizontally-moving head I, the independently-adjustable arm L, as and for the purpose described.

9. The head I, having the chambers for oil, as described.

10. In combination with the vertical shaft N, having the worm $n'$, and mechanism, substantially as described, for actuating the same, the horizontal shaft O, having the wheel $o^7$, and the connecting-box P, for uniting the two together.

11. In combination with the horizontal clutch-shaft O, having the clutch mechanism $o$ $o'$ $o^2$ $o^3$ $o^4$ $o^5$ $o^6$, and receiving movement from a vertical shaft, the horizontal clutch-shaft Q, having the worm $q'$, as described.

12. In combination with a horizontal moving head and a vertically-moving bracket, a vertical shaft capable of lateral movement, a horizontal shaft capable of vertical movement, and a connection-box with contained gearing for uniting the shafts together, substantially as described.

13. In combination with the horizontal shaft O, capable of a longitudinal movement, and having the groove $o^5$, the vertical shaft $o'$, with handle $o^2$ and pin $o^3$, as described.

14. In combination with the mechanism, substantially as described, upon the main driving-shaft, for communicating movement, the vertical shaft N, the horizontal shaft O, and connection-box containing connecting-gearing, the shaft N being capable of lateral movement relatively to shaft O, and the shaft O being capable of vertical movement relatively to the shaft N, as described.

15. In a machine of the class described, a supporting-column provided with suitable sliding ways, combined with a vertically-adjustable knee or slide for holding work, a horizontally-adjustable head supporting the cutter-spindle, driving mechanism, substantially as described, and an automatically-adjustable connection, as described.

This specification signed and witnessed this 10th day of April, 1883.

CHARLES E. LIPE.

Witnesses:
E. E. SMITH,
F. W. DALTON.